United States Patent
Natsume et al.

(10) Patent No.: US 7,151,068 B2
(45) Date of Patent: Dec. 19, 2006

(54) SINTERED OBJECT OF SILICON MONOXIDE AND METHOD FOR PRODUCING THE SAME

(75) Inventors: Yoshitake Natsume, Itami (JP);
Tadashi Ogasawara, Nishinomiya (JP);
Munetoshi Watanabe, Suita (JP);
Kazuomi Azuma, Kobe (JP);
Toshiharu Iwase, Kobe (JP)

(73) Assignee: Sumitomo Titanium Corporation, Hyogo (JP)

( * ) Notice: Subject to any disclaimer, the term of this patent is extended or adjusted under 35 U.S.C. 154(b) by 116 days.

(21) Appl. No.: 10/501,996

(22) PCT Filed: Nov. 29, 2002

(86) PCT No.: PCT/JP02/12567

§ 371 (c)(1),
(2), (4) Date: Jul. 21, 2004

(87) PCT Pub. No.: WO03/070659

PCT Pub. Date: Aug. 28, 2003

(65) Prior Publication Data

US 2005/0085095 A1    Apr. 21, 2005

(30) Foreign Application Priority Data

Feb. 22, 2002    (JP) .............................. 2002-046711

(51) Int. Cl.
*C04B 35/01* (2006.01)
(52) U.S. Cl. ...................................... 501/154; 423/335
(58) Field of Classification Search ............... 501/154; 423/335
See application file for complete search history.

(56) References Cited

U.S. PATENT DOCUMENTS

| | | | | |
|---|---|---|---|---|
| 3,010,839 A | * | 11/1961 | Drumheller et al. | 106/286.8 |
| 2003/0150377 A1 | * | 8/2003 | Arimoto et al. | 117/84 |
| 2004/0182700 A1 | * | 9/2004 | Natsume et al. | 204/298.13 |
| 2004/0241075 A1 | * | 12/2004 | Nishioka | 423/325 |

FOREIGN PATENT DOCUMENTS

| | | |
|---|---|---|
| JP | 38-12513 | 7/1959 |
| JP | 63-166965 | 7/1988 |
| JP | 63-310961 | 12/1988 |

* cited by examiner

*Primary Examiner*—David Sample
(74) *Attorney, Agent, or Firm*—Clark & Brody

(57) ABSTRACT

A sintered object of silicon monoxide for use as a material for forming silicon oxide thin films is provided of which the evaporation residue as determined by subjecting a sample thereof to thermogravimetry at a heating temperature of 1,300° C. and in a vacuum atmosphere, namely at a pressure of not higher than 10 Pa, is not more than 4% by mass relative to the sample before measurement. This sintered object can be produced by sintering SiO particles having a particle diameter of not smaller than 250 μm, either after press forming thereof or during press forming thereof, in a non-oxygen atmosphere. This sintered object is high in evaporation rate and, when it is used as a material for film formation, an improvement in productivity in producing silicon oxide thin films can be expected. Thus, it can be widely applied in forming silicon oxide thin films useful as electric insulating films, mechanical protection films, optical films, barrier films of food packaging materials, etc.

2 Claims, 3 Drawing Sheets

SINTERED OBJECT OF SILICON MONOXIDE AND METHOD FOR PRODUCING THE SAME

TECHNICAL FIELD

This invention relates to a sintered object of silicon monoxide and a method of production thereof and, more particularly, to a sintered object of silicon monoxide and a method of production thereof, which is used in forming silicon oxide thin films useful as electric insulating films, mechanical protection films, optical films and gas barriers for food packaging materials, among others.

BACKGROUND ART

Thin films or layers made of silicon oxide, such as silicon monoxide (SiO) or silicon dioxide ($SiO_2$), are excellent in electric insulating properties and high in mechanical strength as well and, therefore, are used as optical films and protective films for various electronics parts, and barrier films for devices, among others. Further, they are transparent and excellent in gas barrier properties, so that they are utilized also as surface coatings of food packaging materials.

Such silicon oxide thin films are generally formed by the so-called vapor deposition technique, namely by heating a silicon oxide species, which is a material for film formation as well as a material for vapor deposition, for evaporation thereof and for allowing the same to deposit on a substrate. In heating silicon oxide, various techniques, such as resistance heating, high frequency induction heating, electron beam heating and laser heating, are employed. In recent years, electron beams and plasma are used as the heat source in many instances.

In forming films utilizing electron beam heating or plasma heating, it is necessary to mold or form silicon oxide into cylinders or prisms and pelletize them for obtaining materials for film formation to be irradiated with electron beams or plasma.

Currently, silicon dioxide thin films are in the mainstream among silicon oxide thin films. However, in some cases, silicon dioxide thin films are unsatisfactory in adhesion to substrates according to the compatibility therebetween. Therefore, silicon monoxide thin films are preferably used in such and other cases.

As for the material for forming silicon monoxide thin films, there are disclosures in Publications of Unexamined Japanese Patent Application No. 63-166965 and No. 63-310961. According to the disclosures in these publications, silicon monoxide thin films are allegedly formed by vapor deposition using a material for film formation which comprises metallic silicon and silicon dioxide.

However, the materials for film formation as disclosed in these publications are neither uniform in composition nor good in evaporation characteristics, hence they raise problems, namely unequal film thicknesses and/or compositions result, and the formation of good silicon monoxide thin films becomes difficult.

DISCLOSURE OF INVENTION

For solving the above problems, it is effective to produce a film-forming material comprising silicon monoxide and subject the same to vapor deposition. For example, Publication of Examined Japanese Patent Application No. 38-12513 discloses an invention relating to a silicon monoxide-containing material for film formation and a method of producing the same.

According to the invention disclosed in the above-cited publication, it is alleged that a good silicon monoxide material for film formation having uniform composition can be obtained by compressing a mixture of silicon monoxide particles and a colloidal silicic material solution into a desired shape and sintering the same in an oxygen-containing atmosphere to bind the silicon monoxide particles together by means of the silicic material.

Further, on the occasion of vapor deposition, silicon monoxide shows a higher rate of evaporation as compared with silicon dioxide. Therefore, when a material for film formation which comprises silicon monoxide is used, the rate of thin film formation can be increased.

However, the evaporation characteristics of the silicon monoxide-containing material for film formation as produced by sintering depend on various conditions, such as the particle size and method of production of the silicon monoxide particles used in the production of that material; the rate of evaporation of the sintered material for film formation is low as compared with silicon monoxide before sintering, hence the use of such silicon monoxide-containing material for film formation cannot be expected to result in productivity improvements in thin film formation.

It is an object of the present invention, which has been made in view of the above-discussed state of production of such silicon monoxide-based materials for film formation, to provide a sintered article or object of silicon monoxide which shows a high rate of evaporation as well as a method of producing the same.

The present inventors made investigations in search of a sintered object of silicon monoxide which retains a high evaporation rate even after sintering and a method of producing the same.

First, the reason why the evaporation rate of silicon monoxide after sintering differs from that before sintering is that silicon monoxide undergoes some changes in the resulting composition on the occasion of sintering. From the energy viewpoint, silicon dioxide is a stable material as compared with silicon monoxide, and the evaporation rate of silicon dioxide is lower than that of silicon monoxide. Therefore, even when a silicon monoxide-based material for film formation is produced, silicon monoxide is presumably oxidized locally and a part thereof is thus converted to silicon dioxide, resulting in a decrease in rate of evaporation.

The oxidation of silicon monoxide can occur in the manner of spontaneous oxidation upon standing in the air, or on the occasion of sintering in an oxygen-containing atmosphere. Therefore, if silicon monoxide particles (SiO particles) small in surface area are used to prevent spontaneous oxidation and, further, if such silicon monoxide particles are sintered in a non-oxygen atmosphere, it will be able to prevent the oxidation of silicon monoxide to the least.

The inventors found that the thus-produced sintered object of silicon monoxide is high in rate of evaporation and the evaporation residue thereof as measured by thermogravimetry is very slight.

The present invention has been completed based on the above findings, and the gist thereof consists in (1) a sintered object of silicon monoxide as defined below and (2) a method of producing sintered objects of silicon monoxide as defined below.

(1) A sintered object of silicon monoxide for use as a material for forming silicon oxide thin films the evaporation residue of which object as determined by subjecting a sample thereof to thermogravimetry at a heating temperature of 1,300° C. and in a vacuum atmosphere, namely at a pressure of not higher than 10 Pa, is not more than 4% by mass relative to the sample before measurement.

(2) A method of producing sintered objects of silicon monoxide for use as materials for forming silicon oxide thin films which comprises sintering SiO particles having a particle diameter of not smaller than 250 μm, either after press forming thereof or during press forming thereof, in a non-oxygen atmosphere.

BEST MODES FOR CARRYING OUT THE INVENTION

The sintered object of silicon monoxide according to the invention is to be used as a material for forming silicon oxide thin films. It is not always necessary that the silicon oxide thin films be thin films of the same silicon monoxide as the material for film formation. Thus, for example, the films may be made of silicon dioxide resulting from spontaneous oxidation or forced oxidation after evaporation from the sintered object.

The sintered object of silicon monoxide according to the invention is characterized in that the evaporation residue thereof after thermogravimetry at a heating temperature of 1,300° C. in a vacuum atmosphere, namely at a pressure of not higher than 10 Pa, is not more than 4% of the mass before measurement.

Figure 1:
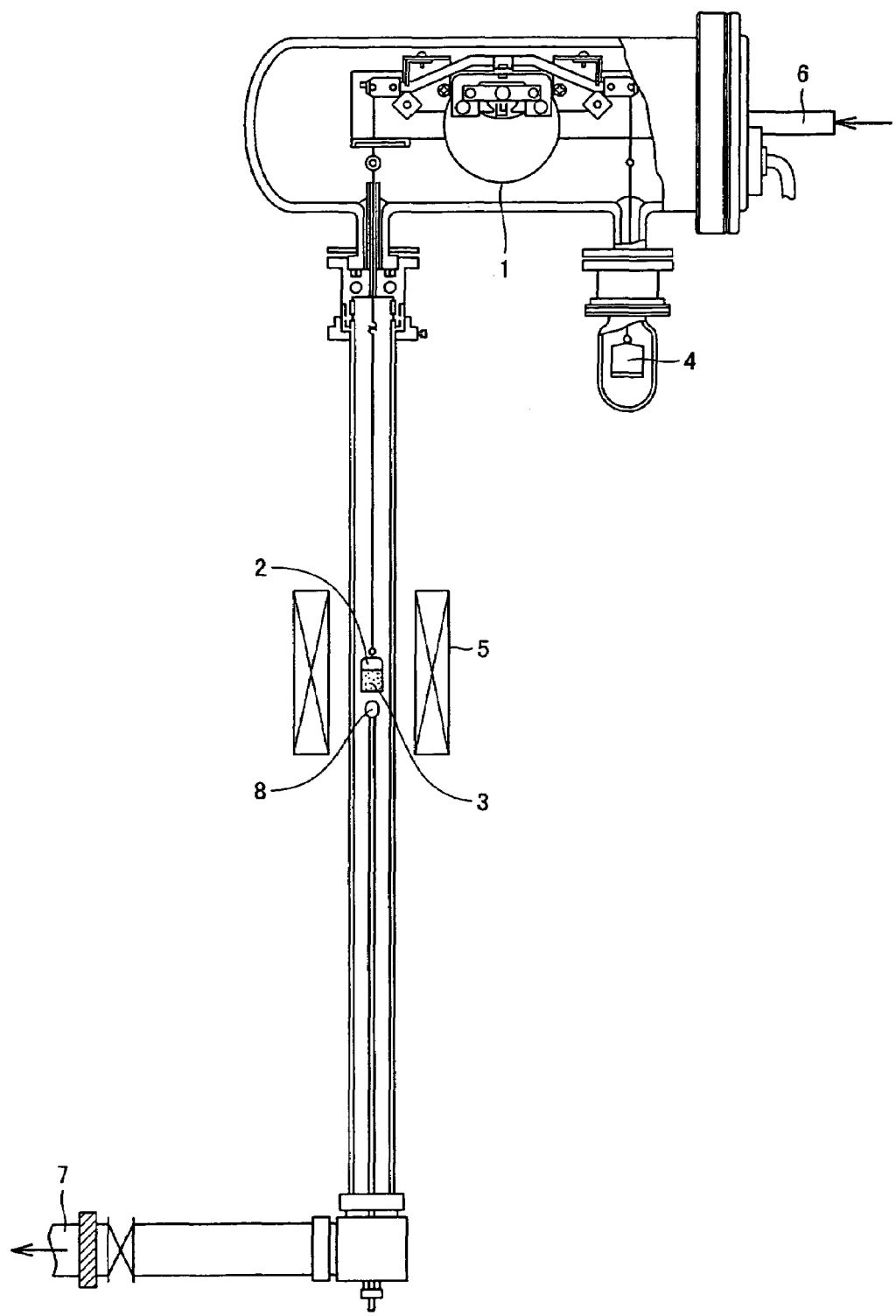
FIG. 1 is a sectional view illustrating the constitution of a thermogravimetry apparatus to be used in thermogravimetry.

FIG. 1 is a sectional view illustrating the constitution of a thermogravimetry apparatus to be used in the thermogravimetry. In carrying out the thermogravimetry, a measurement sample 3 is placed in a crucible 2 suspended on one end of a balance 1. A weight 4 matching the measurement sample 3 in mass is suspended on the other end of the balance. The thermogravimetry apparatus is equipped with a heating furnace 5, a gas inlet 6, a gas exhaust port 7 and so forth, and these serve to adjust the temperature of the measurement sample 3 and the atmosphere.

As the mass of the measurement sample 3 decreases as a result of evaporation of the measurement sample 3, an electric current is passed through a feedback coil disposed in a uniform magnetic field to generate an electromagnetic force and maintain the balance against the weight 4. In that case, the electromagnetic force and the current value are in a directly proportional relation and, therefore, the changes in mass of the measurement sample 3 can be registered in terms of changes in electric current value.

The thermogravimetry is carried out by raising the temperature of the measurement sample to 1,300° C. while adjusting the atmosphere to a vacuum atmosphere not higher than 10 Pa in pressure. On that occasion of thermogravimetry, slight fluctuations in temperature of the measurement sample 3 are unavoidable but such slight fluctuations in temperature are allowable if the temperature is within the range of 1,300±50° C. If the thermogravimetry is carried out under such conditions, the sintered object decreases in mass with the progress of evaporation of silicon monoxide.

Figure 2:
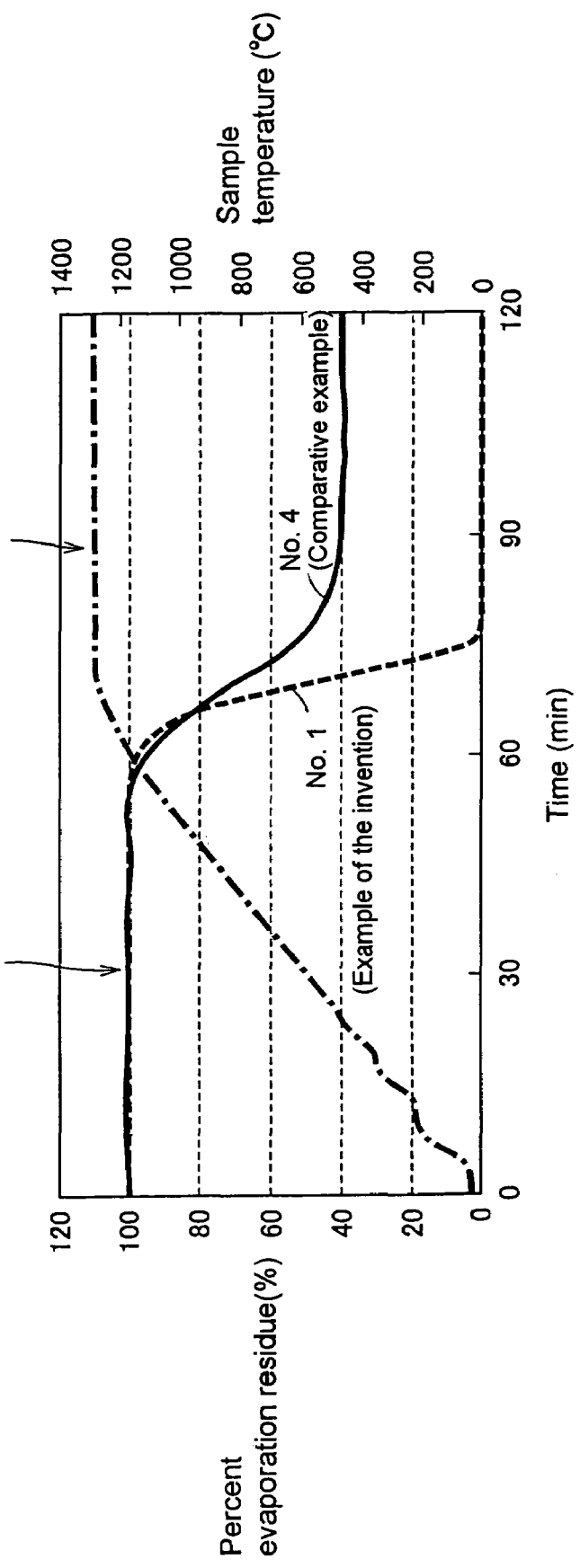
FIG. 2 is a graphic representation of the changes in mass of measurement samples in thermogravimetry.

FIG. 2 is a graph showing the changes in mass of measurement samples in thermogravimetry, indicating the sample temperature (right ordinate) and the percent evaporation residue (left ordinate) each as a function of the elapsed measurement time. In the measurements shown in that figure, the measurement sample temperature was raised from room temperature to 1,300° C.

In that figure, the changes in sample mass on that occasion are shown as percent evaporation residues with the lapse of measurement time, with the mass of the measurement sample before measurement being taken as 100%. The measurement results shown in that figure are the results of measurement of a sample of the sintered object No. 1 (an example of the invention) and a sample of the sintered object No. 4 (a comparative example) each specified in Table 1 in the example section given later herein.

As shown in FIG. 2, when a measurement sample is placed in the crucible and the temperature is raised, the measurement sample begins to evaporate and, after the lapse of a certain period of time, the mass of the measurement sample shows no more substantial change, hence the residue on evaporation to a constant weight can be known. With the sintered object of silicon monoxide according to the invention, the mass of the evaporation residue of the sintered object on that occasion, namely the residue on evaporation to a constant weight, amounts to 4% or less of the mass before measurement.

When this requirement is satisfied, the rate of evaporation of silicon monoxide is high and the productivity in silicon oxide thin film formation by vapor deposition can be improved. Presumably, the evaporation residue mainly consists of silicon dioxide formed by spontaneous oxidation and/or oxidation during sintering.

The sintered object of silicon monoxide according to the invention can be produced by sintering SiO particles having a particle diameter of not smaller than 250 μm, either after press forming thereof or during press forming thereof, in a non-oxygen atmosphere.

It is necessary that SiO particles having a particle diameter of not smaller than 250 μm be used as the raw material of sintered objects. Those SiO particles which have a particle diameter smaller than 250 μm are great in surface area and thus allow the formation of silicon dioxide on their surface as a result of spontaneous oxidation, and this silicon dioxide is reflected in the resulting sintered object, namely the object shows a decreased rate of evaporation. The particle diameter of SiO particles is preferably not greater than 2,000 μm. This is because when it exceeds 2,000 μm, the press-moldability and sintering characteristics become deteriorated.

It is not necessary that the respective SiO particles be substantially uniform in particle diameter, if their respective particle diameters are not smaller than 250 μm. By mixing up and sintering SiO particles differing in particle diameter but not smaller than 250 μm in particle diameter, it becomes possible to increase the density of the sintered object. In cases where the density of the sintered object is not higher than about 95%, the particle sizes of SiO particles can be checked by observing a cross section of the object under an optical microscope and, thus, confirmation can be made as to whether the SiO particles used as the raw material of the sintered object were not smaller than 250 μm in diameter.

Such SiO particles are sintered in a non-oxygen atmosphere after or during press forming into an arbitrary shape. In cases where press forming is followed by sintering, the method of press forming matters little provided that the particles can be formed into an arbitrary shape. In cases where agglutination among SiO particles is poor, it is also possible, for example, to add a small amount of water to SiO particles and, after press forming, remove the water by dehydration treatment. On this occasion, SiO particles can be pressed together and formed into an arbitrary shape by applying a load of about 300 to 1,500 kg/cm$^2$.

When, on the other hand, the sintering is carried out while carrying out press forming, it is sufficient to apply a load of about 100 to 300 kg/cm$^2$, since the temperature of SiO particles is raised.

It is necessary that the sintering be carried out in a non-oxygen atmosphere. The non-oxygen atmosphere is an oxygen-free atmosphere, for example a vacuum atmosphere or an inert atmosphere such as an argon gas atmosphere. When the sintering is carried out in a vacuum atmosphere, in particular, the rate of evaporation of the sintered object of silicon monoxide is the same as that of SiO particles before sintering. Thus, the sintering is preferably carried out in a vacuum atmosphere. If the sintering is carried out in an oxygen-containing atmosphere, SiO particles will be oxidized and the evaporation rate will decrease.

The sintering temperature is not particularly restricted provided that SiO particles can be bonded together and the bonded shape can be maintained. It will be sufficient if the sintering is carried out at 1,200–1,350° C. for 1 hour or longer.

As mentioned above, sintered objects of silicon monoxide showing a high evaporation rate can be produced by preventing the SiO particles from spontaneous oxidation and oxidation during sintering.

EXAMPLES

Sintered objects of silicon monoxide were produced according to the method of producing sintered objects according to the invention.

The conditions employed in producing the sintered objects of silicon monoxide are shown in Table 1 given below. In the table, there are also given, for comparison, the production conditions for a sintered object (No. 4) produced by sintering in an ambient atmosphere and for sintered objects (No. 5 and No. 6) produced from SiO particles smaller in particle diameter than the SiO particles defined herein.

TABLE 1

| No. | Particle diameter of SiO particles (μm) | Sintering method | Sintering atmosphere | Sintering conditions | Remark |
|---|---|---|---|---|---|
| 1 | 250~1700 | Sintering while pressing under a load of 100 kg/cm$^2$. | Vacuum | 1200° C. × 1.5 hrs. | Examples of the invention |
| 2 | 1700~2000 | Sintering while pressing under a load of 100 kg/cm$^2$. | Vacuum | 1200° C. × 1.5 hrs. | |
| 3 | 250~1700 | Admixing 5 wt % of water with SiO particles, followed by press forming under a load of 1000 kg/cm$^2$ and, after dehydration treatment, sintering. | Ar | 1350° C. × 1 hr. | |
| 4 | 250~1700 | Admixing 5 wt % of water with SiO particles, followed by press forming under a load of 1000 kg/cm$^2$ and, after dehydration treatment, sintering. | Air | 1200° C. × 1 hr. | Comparative examples |
| 5 | <45 | Admixing 5 wt % of water with SiO particles, followed by press forming under a load of 1000 kg/cm$^2$ and, after dehydration treatment, sintering. | Ar | 1200° C. × 1 hr. | |
| 6 | <150 | Sintering while pressing under a load of 200 kg/cm$^2$. | Vacuum | 1250° C. × 1.5 hrs. | |

Each sintered object obtained was subjected to thermogravimetry at a heating temperature of 1,300° C. in a vacuum atmosphere, namely at a pressure of not higher than 10 Pa, using the thermogravimetry apparatus shown in FIG. 1. Here, the temperature 1,300° C. is the temperature measured at a site about 1 mm distant from the measurement sample using a thermocouple 8 and it is deemed that the measurement sample was substantially heated to that temperature. The data obtained by thermogravimetry were collated, the evaporation rate was calculated from the change in mass versus the measurement time, and the mass ratio (percent evaporation residue) of the mass of the evaporation residue, namely the mass found when there was no substantial change in mass of the sintered object, to the mass before measurement was calculated.

Further, each sintered object was evaporated by irradiation with electron beams and the vapor was allowed to deposit on a substrate to form a silicon oxide thin film for evaluation of the rate of film formation.

Figure 3:
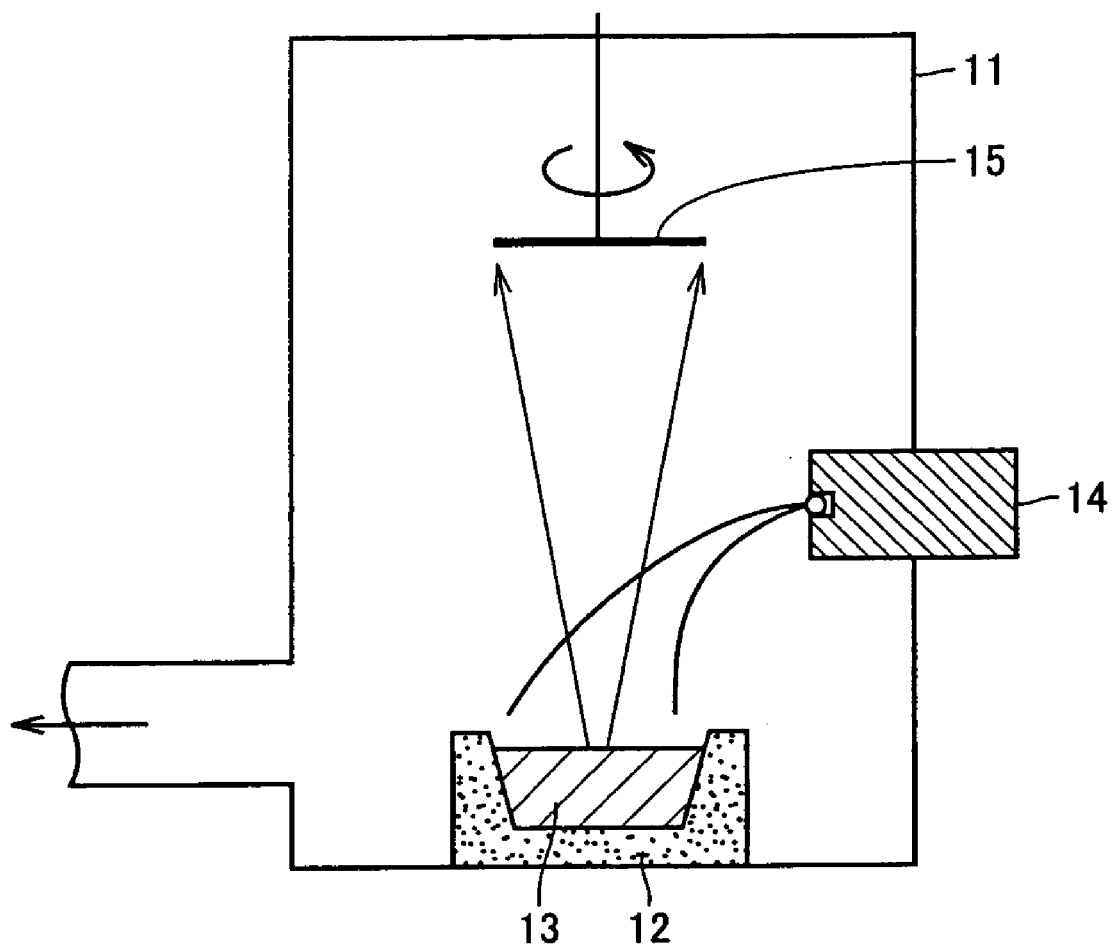
FIG. 3 is a schematic representation of the constitution of the electron beam vapor deposition apparatus used in the examples.

FIG. 3 is a schematic representation of the constitution of the electron beam vapor deposition apparatus used in each example. As shown in the figure, the sintered object 13, which was the material for film formation and the target of electron beams, was placed in a water-cooled copper crucible 12 disposed within a chamber 11, the sintered object 13 was irradiated with electron beams 14 while evacuating the inside of the chamber 11, and the silicon monoxide vapor was allowed to deposit on a glass substrate 15 placed at a distance of 30 cm from the sintered object 13 to form a silicon oxide thin film or layer. On that occasion, the degree of vacuum within the chamber 11 was adjusted to 0.04 Pa or below, and the output of electron beams was 0.8 W. The thin film obtained was measured for its thickness using a thin film thickness meter, and the rate of film formation was calculated based on that thickness and the vapor deposition time.

Given in Table 2 are the percent evaporation residue values, the rates of evaporation, and the rates of film formation by electron beam vapor deposition for the sintered objects of silicon monoxide as produced by the production method of the invention and the sintered objects produced for comparison. The Nos. in Table 2 correspond to those in Table 1.

TABLE 2

| No. | Percent evaporation residue (%) | Evaporation rate (g/sec) | Rate of film formation in electron beam vapor deposition (nm/sec) | Remark |
| --- | --- | --- | --- | --- |
| 1 | 2 | 0.52 | 28.0 | Examples of the invention |
| 2 | 1 | 0.55 | 26.8 | |
| 3 | 2 | 0.25 | 20.0 | |
| 4 | 40 | 0.15 | 2.8 | Comparative examples |
| 5 | 15 | 0.17 | 5.9 | |
| 6 | 5 | 0.21 | 15.0 | |

The sintered objects of silicon monoxide produced by the method of producing sintered objects according to the invention were as low as 1 to 2% in percent evaporation residue and were high in evaporation rate. With them, the rates of film formation on the substrate were also actually high; thus, an improvement in productivity in producing silicon oxide thin films can be expected. In particular, the sintered objects of silicon monoxide produced by sintering in a vacuum atmosphere while carrying out press forming were very high in evaporation rate; thus, a higher level of improvement in productivity can be expected.

On the other hand, the sintered object (No. 4) of silicon monoxide for which the sintering was carried out in an ambient atmosphere was very high, namely 40%, in percent evaporation residue, and the evaporation rate and film formation rate were very low with it. This is due to the fact that oxygen contained in the atmosphere reacted with silicon monoxide during sintering to form silicon dioxide.

The sintered objects (No. 5 and No. 6) of silicon monoxide produced from SiO particles smaller in particle diameter than the SiO particles defined in accordance with the invention were also high in percent evaporation residue and were low in evaporation rate and film formation rate. Such results obtained with them in spite of sintering thereof in a non-oxygen atmosphere indicate that the surface of SiO particles was spontaneously oxidized and, as a result, the content of silicon dioxide in the SiO particles increased.

As explained hereinabove, the method of producing sintered objects of silicon monoxide according to the invention makes it possible to obtain sintered objects showing a high rate of evaporation while inhibiting the oxidation of silicon monoxide to the least. When such sintered objects of silicon monoxide are used as materials for film formation, the productivity in the production of silicon oxide thin films can be improved.

INDUSTRIAL APPLICABILITY

The sintered object of silicon monoxide according to the invention has an evaporation residue, as determined by thermogravimetry, of not more than 4% of the mass before measurement and is high in evaporation rate and, when it is used as a material for film formation, an improvement in productivity in the production of silicon oxide thin films can be expected. When the method of producing sintered objects of silicon monoxide according to the invention is employed, sintered objects showing a high rate of evaporation can be obtained while inhibiting the oxidation of silicon monoxide as low as possible. Accordingly, such sintered objects can be widely applied in forming silicon oxide thin films useful as electric insulating films, mechanical protection films, optical films and barrier films of food packaging materials, among others.

The invention claimed is:

1. A sintered object of silicon monoxide for use as a material for forming silicon oxide thin films, the evaporation residue of which object, as determined by subjecting a sample thereof to thermogravimetry at a heating temperature of 1,300° C. and in a vacuum atmosphere, namely at a pressure of not higher than 10 Pa, is not more than 4% by mass relative to the sample before measurement.

2. A sintered object of silicon monoxide according to claim 1, wherein, in the thermogravimetry, the heating temperature is controlled within the range of 1,300° C.±50° C.

* * * * *